United States Patent
Riederer et al.

(10) Patent No.: US 6,365,987 B2
(45) Date of Patent: Apr. 2, 2002

(54) DEVICE FOR TRIGGERING AND METHOD FOR OPERATING AN OCCUPANT PROTECTION DEVICE OF A MOTOR VEHICLE USING A TESTABLE ACCELERATION SWITCH

(75) Inventors: Ludwig Riederer, Thalmassing; Claus Schmidt, Regensburg; Marten Swart, Obertraubling, all of (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 09/748,476

(22) Filed: Dec. 26, 2000

Related U.S. Application Data

(63) Continuation of application No. PCT/DE99/01622, filed on Jun. 1, 1999.

(30) Foreign Application Priority Data

Jun. 25, 1998 (DE) .......................................... 198 28 432

(51) Int. Cl.⁷ .......................... H01H 35/14; B60R 21/32
(52) U.S. Cl. ....................... 307/10.1; 180/282; 280/735
(58) Field of Search ................................. 307/9.1, 10.1; 180/271, 282; 280/728.1, 735

(56) References Cited

U.S. PATENT DOCUMENTS

| | | | | |
|---|---|---|---|---|
| 4,243,971 A | * | 1/1981 | Schowerskyj et al. | 340/52 |
| 4,608,501 A | * | 8/1986 | Andres et al. | 307/10.1 |
| 5,182,459 A | * | 1/1993 | Okano et al. | 307/10.1 |
| 5,261,694 A | * | 11/1993 | White et al. | 280/735 |
| 5,359,515 A | * | 10/1994 | Weller et al. | 307/10.1 |
| 5,389,822 A | * | 2/1995 | Hora et al. | 307/10.1 |
| 5,406,127 A | * | 4/1995 | Furui et al. | 307/10.1 |
| 5,433,101 A | | 7/1995 | Spangler et al. | |
| 5,460,404 A | | 10/1995 | Damisch et al. | |
| 5,493,270 A | * | 2/1996 | Kondo | 280/735 |
| 5,656,991 A | * | 8/1997 | Hargenrader et al. | 307/10.1 |
| 5,657,831 A | | 8/1997 | Furui | |
| 5,726,887 A | * | 3/1998 | Spies et al. | 307/10.1 |
| 5,828,138 A | | 10/1998 | McIver et al. | |
| 5,845,729 A | * | 12/1998 | Smith et al. | 307/10.1 |
| 5,861,681 A | * | 1/1999 | Nakano et al. | 307/10.1 |
| 5,977,653 A | * | 11/1999 | Schmid et al. | 307/10.1 |
| 6,070,113 A | * | 5/2000 | White et al. | 180/282 |
| 6,072,247 A | * | 6/2000 | Lammert et al. | 307/10.1 |
| 6,256,562 B1 | * | 7/2001 | Frimberger et al. | 307/10.1 |
| 6,282,941 B1 | * | 9/2001 | Mader | 73/1.39 |

FOREIGN PATENT DOCUMENTS

| | | |
|---|---|---|
| DE | 28 08 872 C2 | 1/1986 |
| DE | 90 01 803 | 6/1990 |
| DE | 39 24 595 A1 | 1/1991 |
| DE | 196 25 618 C1 | 9/1997 |
| EP | 0 794 094 A2 | 9/1997 |

\* cited by examiner

*Primary Examiner*—Josie Ballato
*Assistant Examiner*—Roberto Rios
(74) *Attorney, Agent, or Firm*—Herbert L. Lerner; Laurence A. Greenberg; Werner H. Stemer

(57) ABSTRACT

A passenger protection device of an automobile is triggered when a testable acceleration switch supplies a switch signal and an electrically controlled switching device is actuated by a control circuit depending on a collision. Actuation of the switching device is prevented on a triggering circuit side by a blocking device so that the passenger protection device is not triggered as a result of faulty control switching during testing of the acceleration switch.

14 Claims, 2 Drawing Sheets

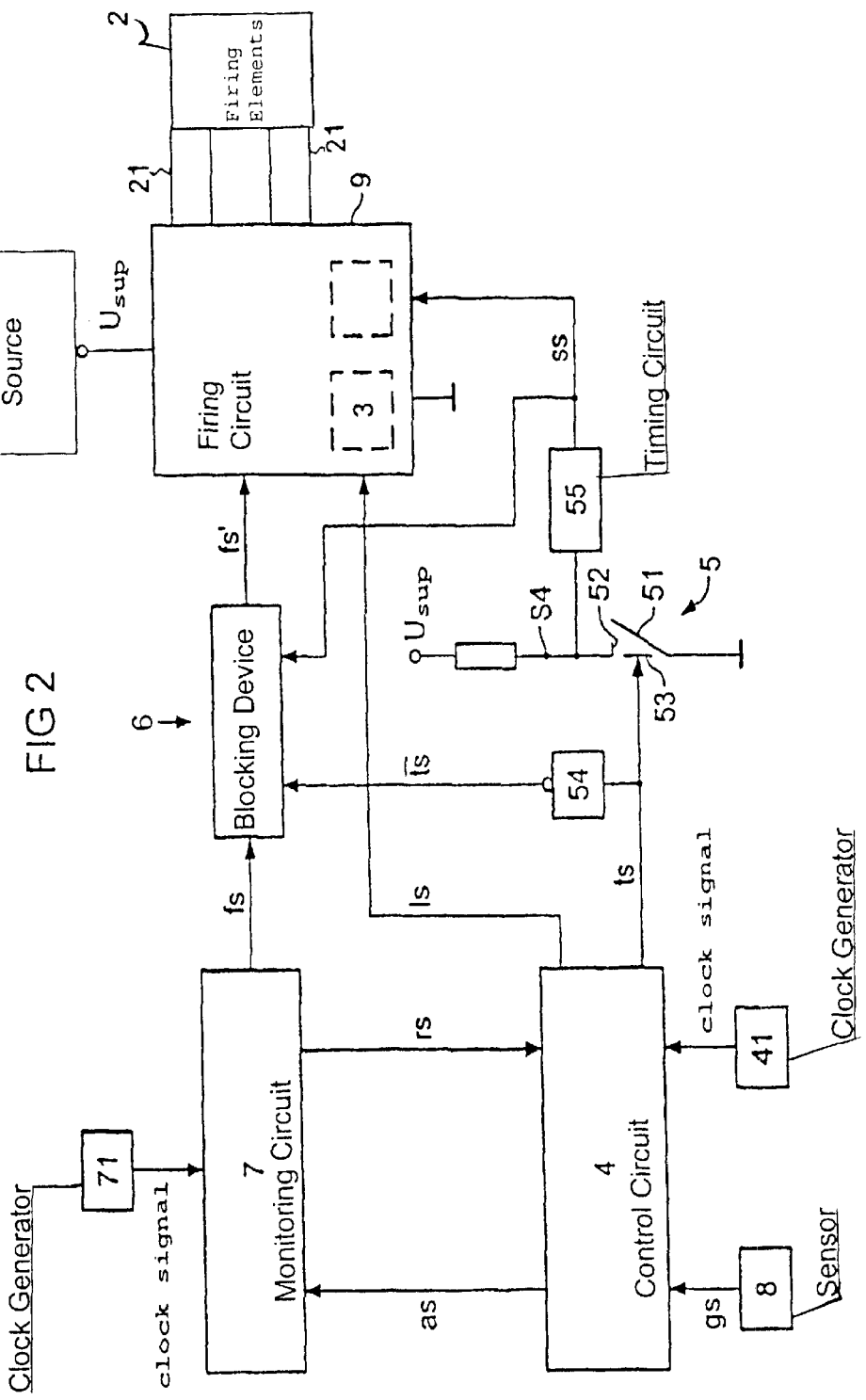

DEVICE FOR TRIGGERING AND METHOD FOR OPERATING AN OCCUPANT PROTECTION DEVICE OF A MOTOR VEHICLE USING A TESTABLE ACCELERATION SWITCH

CROSS-REFERENCE TO RELATED APPLICATION

This application is a continuation of copending International Application PCT/DE99/01622, filed Jun. 1, 1999, which designated the United States.

BACKGROUND OF THE INVENTION

Field of the Invention

The invention relates to a device for triggering an occupant protection device of a motor vehicle.

U.S. Pat. No. 5,460,404 discloses an occupant protection device in which a series circuit contains an energy source, a first controllable output stage and a parallel circuit containing three series paths each having a firing element and a further controllable output stage. Each firing element is triggered when the common output stage and, at the same time, the firing stages individually assigned to the respective firing element are switched on. In this case, the individually assigned firing stages are controlled by a microprocessor, which identifies an impact on the basis of an evaluation of an acceleration signal. The common output stage is controlled by a customer-specific integrated circuit configuration which monitors the voltage drop across an electromechanical acceleration switch and can thus identify the closing of the switching contacts and hence the necessity of driving the common output stage.

Published, Non-Prosecuted German Patent Application DE 196 25 618 A1 discloses an electromechanical acceleration switch of a testable configuration. The acceleration switch has an acceleration-dependent bending electrode that can be moved in the direction of a fixed electrode. If the fixed electrode and the bending electrode make contact, then the micromechanically configured acceleration switch—between whose fixed and bending electrodes a voltage is present in the contactless state-emits a switching signal in the form of a current pulse, which is identified by a control circuit. Furthermore, such an acceleration switch has a test electrode which, upon application of a voltage, directs the bending electrode toward the fixed electrode on account of electrostatic forces and thus causes, in an electrically controlled manner, the acceleration switch electrodes to close.

If the electromechanical acceleration switch from U.S. Pat. No. 5,460,404 is replaced by a testable micromechanical acceleration switch in accordance with the Published, Non-Prosecuted German Patent Application DE 196 25 618 A1, then it is the case that during the testing of the acceleration switch, the firing of the firing elements is prevented owing to the non-activated output stages that are individually assigned to the firing elements. However, this holds true only insofar as the microprocessor operates without any faults and does not supply a control signal for turning on the output stages. However, if the microprocessor is defective during a test run for the acceleration switch, then there is the risk of occupant-endangering incorrect triggering of one or more restraint devices of the occupant protection system, such as airbags or seat-belt pretensioners.

SUMMARY OF THE INVENTION

It is accordingly an object of the invention to provide a device for triggering and a method for operating an occupant protection device of a motor vehicle using a testable acceleration switch which overcome the above-mentioned disadvantages of the prior art methods and devices of the general type, which prevents triggering of a restraint device during an acceleration switch test.

With the foregoing and other objects in view there is provided, in accordance with the invention, a device for triggering an occupant protection device of a motor vehicle.

The device contains an energy source, a firing element for the occupant protection device, and an electrically controllable switching device connected to the energy source and to the firing element for transmitting energy from the energy source to the firing element if the switching device is actuated. A control circuit is connected to the switching device for impact-dependent actuation of the switching device, and a testable acceleration switch generates a switching signal. The occupant protection device is triggered if the switching device is actuated and the testable acceleration switch supplies the switching signal to the switching device. A blocking device is connected between the switching device and the control unit, the blocking device prevents the actuation of the switching device during a test of the testable acceleration switch.

The invention provides a blocking device which prevents the actuation of the switching device during a test of the acceleration switch and whose hardware is preferably configured independently of the control circuit. For the duration of the acceleration switch test, that is to say at least for the duration in which the contacts of the acceleration switch are closed, the blocking device prevents triggering of the firing element, even if the switching device is driven on account of a trigger signal from the microprocessor.

By way of example, if the control circuit is configured as a microprocessor, then the blocking device is preferably not configured as a software function of the microprocessor but as an autonomous component, for example on a carrier configured separately from the microprocessor. This further reduces the probability of incorrect triggering.

In accordance with an added feature of the invention, a monitoring device is connected to the control circuit. The monitoring device generates an enable signal received by the switching device in dependence on an operating state of the control circuit that has been determined, and the switching device can be actuated by the control circuit only if the enable signal is present.

In accordance with an additional feature of the invention, the control circuit outputs an operating control signal; and the monitoring device is configured for checking the operating clock signal output by the control circuit, and the enable signal is output by the monitoring device as long as the operating clock signal has no irregularity.

In accordance with another feature of the invention, the blocking device receives the enable signal from the monitoring device and can interrupt the enable signal so that it is not received by the switching device.

In accordance with a further feature of the invention, the control circuit generates a test signal received by the testable acceleration switch and the blocking device, the blocking device being activated with the beginning of the test signal.

In accordance with another added feature of the invention, a timing element is connected to the testable acceleration switch, and the timing element supplies the switching signal, which has a defined time duration, if the testable acceleration switch is activated.

In accordance with another additional feature of the invention, the blocking device is deactivated at the end of the switching signal.

In accordance with another further feature of the invention, the blocking device is formed of hardware that is independent of hardware forming the control circuit.

With the foregoing and other objects in view there is also provided, in accordance with the invention, a method for operating an occupant protection device of a motor vehicle. The method includes the steps of:

triggering the occupant protection device if a testable acceleration switch supplies a switching signal and an electrically controllable switching device is actuated by a control circuit in an impact-dependent manner;

actuating and testing the testable acceleration switch; and preventing the switching device from being actuated during the testing of the testable acceleration switch.

In accordance with an added feature of the invention, there are the steps of determining an operating state of the control circuit; and enabling the switching device in a manner dependent on the operating state that has been determined. The switching device only being able to be actuated if the switching device is enabled for actuation.

In accordance with another feature of the invention, there is the step of monitoring an operating clock signal of the control circuit and enabling the switching device as long as the operating clock signal has no irregularity.

In accordance with an additional feature of the invention, there is the step of interrupting the enabling of the switching device during the testing of the testable acceleration.

In accordance with a further feature of the invention, there is the step of generating a test signal for closing acceleration switch contacts of the testable accelerating switch and interrupting the enabling of the switching device at a beginning of the test signal.

In accordance with a concomitant feature of the invention, there is the step of providing the switching signal of the testable acceleration switch with a defined time duration and the interruption of the enabling of the switching device is cancelled with an end of the switching signal.

Other features which are considered as characteristic for the invention are set forth in the appended claims.

Although the invention is illustrated and described herein as embodied in a device for triggering and a method for operating an occupant protection device of a motor vehicle using a testable acceleration switch, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 2 is a block circuit diagram of the device according to the invention.

DESCRIPTION OF THE PREFERRED EMBODIMENTS

Figure 1:
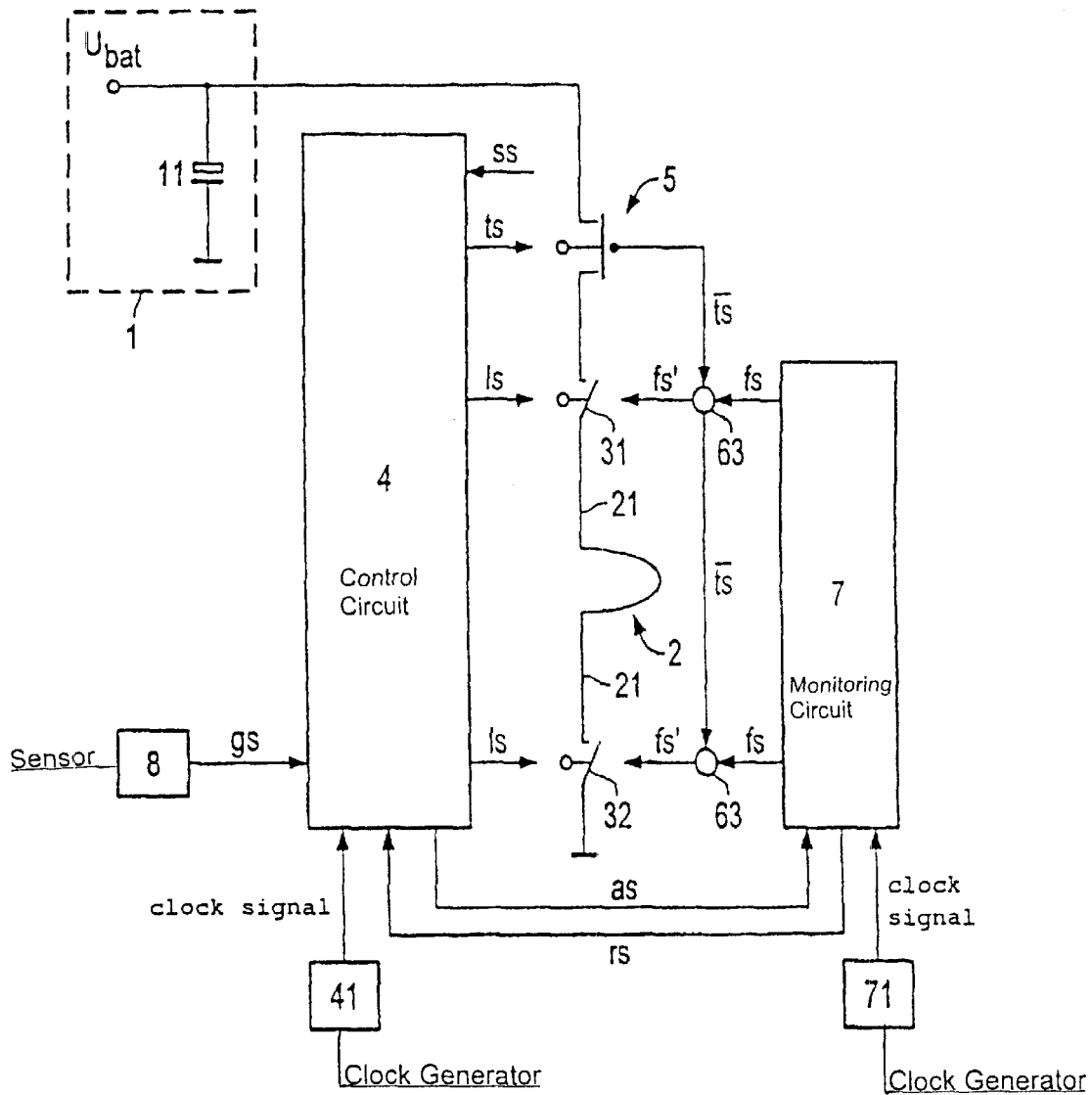
FIG. 1 is a block circuit diagram of a device according to the invention.

In all the figures of the drawing, sub-features and integral parts that correspond to one another bear the same reference symbol in each case. Referring now to the figures of the drawing in detail and first, particularly, to FIG. 1 thereof, there is shown a circuit diagram of a device according to the invention for triggering an occupant protection device. An energy source 1, such as a battery, is disposed in series with an electromechanical acceleration switch 5, a first electrically controllable output stage 31, a firing element 2 of the occupant protection device and a second electrically controllable output stage 32. Applying current from the energy source 1 to the firing element 2 requires a controlled switch-on of a switching circuit, formed of the electrically controllable output stages 31 and 32, and controlled by a control circuit 4, which is preferably a microprocessor, as well as a simultaneous closing of contacts of the acceleration switch 5. It is incumbent upon the person skilled in the art to employ his ability to configure the circuit alternatively in such a way that energy is applied to the firing element 2 when the contacts of the acceleration switch 5 open or when the switching device is switched off.

The energy source 1, the control circuit 4, the acceleration switch 5, and the controllable output stages 31 and 32 are usually disposed in an airbag control unit in the motor vehicle. The airbag control unit is connected via leads 21 to the firing element 2 disposed in the occupant protection device. The controllable output stages 31 and 32 are switched on by trigger signals ls from the control circuit 4. In this case, the control unit 4 generates the trigger signals ls if the evaluation of an acceleration signal gs supplied by an acceleration sensor 8 has identified an impact severe enough to trigger the occupant protection device. In order that a trigger decision does not depend solely on the functionality of a single sensor and a single control circuit, occupant protection devices usually have an electromechanical acceleration switch whose bending arm with seismic mass as a bending electrode, upon the action of a minimum acceleration, closes a mating contact as a fixed electrode and thus enables current to flow in the firing circuit 1, 2, 5 according to FIG. 1.

The testable acceleration switch 5 is compelled, to close its contacts in a fashion prompted by a test signal ts from the control circuit 4. However, the contacts through the test signal ts can also be short-circuited in some other way in the test mode. The voltage between the contacts of the acceleration switch 5 is usually picked up during such a test by the control circuit 4, if the contacts close, a switching signal ss is generated. From the evaluation of the switching signal ss in the control circuit 4, it is possible to incur the functionality of the acceleration switch 5. If the voltage between the switching contacts does not collapse, for example, during such a test and if, as a result, no switching signal ss is generated, then the acceleration switch 5, which is open in is quiescent position, cannot be closed. The driver of the motor vehicle is informed of the fault state of the airbag control unit by a visual warning device, for example.

According to the invention, the controllable output stages are now blocked for the duration of the generated test signal in a way that prevents a switch-on even given the presence of the trigger signal ls from the control circuit. By way of example, if each output stage is a field-effect transistor controlled via a gate electrode, then the invention provides an AND gate as a blocking device, whose output is connected to the gate electrode of the respective output stage and to whose inputs the trigger signal ls and an inverted test signal /ts are passed. As a result, the output stages 31 and 32 are blocked for the duration of the acceleration switch test.

Instead of the controllable output stage configured as a transistor, it is possible to use any other electrically controllable switch with a sufficient current-carrying capacity. It is also possible to provide just a single controllable output stage in a firing circuit of the occupant protection device.

As an alternative, an input of the above-described AND gate is connected to the output of a flip-flop which, at its output, supplies a signal corresponding to the switching signal of the acceleration switch, the output of the flip-flop being occupied only when the switching signal ss is causally engendered by a test signal. The flip-flop is set by the test signal and reset in turn by a low state of the switching signal. A circuit of this type is advantageous particularly when the acceleration switch supplies the switching signal ss temporally beyond the action of the test signal ts, by way of example the contacts of the acceleration switch remaining stuck to one another on account of contamination. In this case, too, inadvertent triggering of the firing element 2 is prevented in the event of a defectively operating control circuit. The occupant is preferably informed of the state of the occupant protection system by an optical or acoustic warning device should a test signal ts engender a switching signal ss with a time duration longer than expected.

The blocking of the electrically controllable output stages 31 and 32 during an acceleration switch test is performed in a further alternative advantageous development in accordance with FIG. 1. A monitoring circuit 7 configured a so-called watchdog, is usually provided in an airbag control unit. The monitoring circuit 7 compares an operating clock signal as supplied by the control circuit 4 to a clock signal clock from a clock generator 71 assigned separately to the monitoring circuit 7. An operating clock signal "as" of the control circuit 4, on the other hand, is derived from a clock signal clock from a clock generator 41 assigned separately to the control circuit 4. The method of operation of the monitoring circuit 7 is briefly explained below. If a considerable deviation is determined between the operating clock signal "as" supplied by the control circuit 4 and a desired operating clock signal determined with the aid of the clock generator 71, then the control circuit 4 is reset by a reset signal rs. The purpose of this resetting is to allow the operating clock signal "as" of the control circuit 4 to settle back to the predetermined desired value. If it is ascertained that the operating clock signal "as" which clocks the control circuit 4 does not correspond to the predetermined value—if appropriate with tolerances—then an enable signal fs of the monitoring circuit 7 is interrupted beyond the generation of the reset signal rs. Normally, the enable signal fs is permanently present as long as the monitoring circuit 7 determines a tolerable operating clock signal "as" from the control circuit 4. The enable signal fs has the effect that the controllable output stages 31 and 32 can be turned on on account of the trigger signal ls. The enable signal fs of the monitoring circuit 7 is thus ANDed with the trigger signal from the control circuit 4. The background for blocking the output stages 31 and/or 32 in the event of a non-tolerable operating clock signal "as" is that a defective operation of the entire control circuit 4 is suspected in the event of a seriously incorrect operating clock signal. Moreover, such a defectively operating microprocessor tends to apply a high level to all the outlets, which would result in the undesired closing of the output stages 31 and 32.

According to the invention, the inverted test signal /ts is now appropriately ANDed with the enable signal fs from the monitoring circuit 7, so that the output stages 31 or 32 can generally be activated only outside the test mode. The required AND gate for logically combining the test signal with the enable signal is in each case identified by the reference symbol 63. The test-influenced enable signal fs' in FIG. 1 emerges from this signal logic combination and is then, in turn, ANDed with the trigger signal ls.

In an alternative form, the output of the above-described flip-flop is ANDed with the enable signal fs. If the output stage 31 or 32 is a field-effect transistor, then the output of the AND gate which logically combines the test-influenced enable signal fs' and the trigger signal ls is connected to the gate electrode of the output stage 31 or 32. The advantage of this development is that, with the monitoring circuit present, the hardware configuration for driving the output stages 31 and 32 need hardly be changed.

For all the configurations of the control of the output stages 31 or 32, it is advantageous that the trigger signals ls are logically combined with the signals ts, ss, fs or fs' which identify a test mode of the acceleration switch 5, using hardware which is independent of the hardware of the control circuit 4, with the result that defective operation of the control circuit cannot be transferred to the hardware of the blocking device.

FIG. 2 shows a further exemplary embodiment of the invention. In this case, the configuration according to FIG. 2 differs from the configuration according to FIG. 1 essentially in that the controllable output stages 31 and 32 are present as a switching device 3 in integrated form in an integrated firing circuit 9, which contains further diagnostic and test components and routines. The leads 21 proceeding from the integrated firing circuit 9 go to a firing element(s) 2. A further essential difference from the configuration according to FIG. 1 is, moreover, that the acceleration switch 5, in the event of the triggering of the firing element 2, is configured not to carry current but as a trigger switch which supplies a switching signal ss to the integrated firing circuit 9. In the integrated firing circuit 9, a logic combination is provided with applies sufficient energy to the firing elements 2 only when both the trigger signal ls from the control circuit 4 and the switching signal ss from the acceleration switch 5 are present. In the firing circuit 9, the logic combination can be effected by a corresponding series circuit of controllable output stages.

The configuration of the acceleration switch S as a trigger switch whose switching signal ss is forwarded in the low-level range has the advantage that the acceleration switch 5 does not have to have a high current-carrying capacity and, as a result, can preferably be configured in an integrated, micromechanical form. In accordance with FIG. 2, the acceleration switch 5 in this case again has a bending electrode 51 which acts under the action of an acceleration on a fixed electrode 52 and establishes with the latter a contact which, at a circuit point S4, changes the voltage which is fed as the switching signal ss to the firing circuit 9. On account of the tendency of such micromechanical acceleration switches 5 to bounce, the signal at the circuit point S4 is subsequently subject to the influence of a timing element 55 which prolongs the closing duration and supplies the switching signal ss of a defined temporal length in the event of an edge which is present on an input side and identifies the closing of the acceleration switch 5. The timing element 55 ensures that even at points in time when no switching signal ss is present at the circuit point S4 on account of bounce of the acceleration switch contacts 51 and 52, a trigger signal ls nevertheless leads to the firing of the firing elements. Furthermore, the acceleration switch 5 has a fixed electrode 53, which is driven by the test signal ts from the control circuit 4 and, on account of electrostatic forces, causes the bending electrode 51 to close with the fixed electrode 52. In this case, too, a switching signal is generated at the circuit point S4 and is fed as the switching signal ss with a defined time duration to the integrated firing circuit 9.

As in FIG. 1, the monitoring circuit 7 supplying an enable signal fs is provided for the control circuit 4 in FIG. 2 as well.

In this case, the blocking device 6 generates a test-influenced enable signal fs' for the firing circuit 9 in a manner dependent on the enable signal fs, the optionally inverted test signal ts or the switching signal ss. Thus, during normal operation—in contrast to the test mode—the enable signal fs is present as test-influenced enable signal fs' at the firing circuit 9. During an acceleration switch test, the test-influenced enable signal fs' is preferably interrupted with the beginning of the test signal, of the switching signal ss or of the signal at the circuit point S4. The interruption of the test-influenced enable signal fs' and thus the blocking of firing lasts at least until the switching signal ss has assumed its LOW state again.

In the firing circuit 9, the test-influenced enable signal fs' is once again logically combined with the trigger signal ls by an AND gate.

We claim:

1. A device for triggering an occupant protection device of a motor vehicle, comprising:
   an energy source;
   a firing element for the occupant protection device;
   an electrically controllable switching device connected to said energy source and to said firing element for transmitting energy from said energy source to said firing element if said switching device is actuated;
   a control circuit connected to said switching device for impact-dependent actuation of said switching device;
   a testable acceleration switch generating a switching signal, the occupant protection device being triggered if said switching device is actuated and said testable acceleration switch supplies the switching signal to said switching device;
   a blocking device connected between said switching device and said control unit, said blocking device preventing actuation of said switching device during a test of said testable acceleration switch;
   said control circuit generating a test signal received by said testable acceleration switch and said blocking device, said blocking device being activated with a beginning of the test signal; and
   a timing element connected to said testable acceleration switch, and said timing element supplying the switching signal, which has a defined time duration, if said testable acceleration switch is activated, and said blocking device being deactivated with an end of the switching signal.

2. The device according to claim 1, including a monitoring device connected to said control circuit, said monitoring device generating an enable signal received by said switching device depending on an operating state of said control circuit that has been determined, and said switching device can be actuated by said control circuit only if the enable signal is present.

3. The device according to claim 2, wherein:
   said control circuit outputs an operating clock signal; and
   said monitoring device is configured for checking the operating clock signal output by said control circuit, and the enable signal is output by said monitoring device as long as the operating clock signal has no irregularity.

4. The device according to claim 2, wherein said blocking device receives the enable signal from said monitoring device and can interrupt the enable signal so that it is not received by said switching device.

5. The device according to claim 1, wherein said control circuit generates a test signal received by said testable acceleration switch and said blocking device, said blocking device being activated with a beginning of the test signal.

6. The device according to claim 5, including a timing element connected to said testable acceleration switch, and said timing element supplying the switching signal, which has a defined time duration, if said testable acceleration switch is activated.

7. The device according to claim 6, wherein said blocking device is deactivated with an end of the switching signal.

8. The device according to claim 1, wherein said blocking device is formed of hardware that is independent of hardware forming said control circuit.

9. A method for operating an occupant protection device of a motor vehicle, which comprises the steps of:
   triggering the occupant protection device if a testable acceleration switch supplies a switching signal and an electrically controllable switching device is actuated by a control circuit in an impact-dependent manner;
   preventing the switching device from being enabled during the testing of the testable acceleration switch;
   generating a test signal for closing acceleration switch contacts of the testable accelerating switch and interrupting the enabling of the switching device at a beginning of the test signal;
   providing the switching signal of the testable acceleration switch with a defined time duration and canceling the interruption of the enabling of the switching device with an end of the switching signal.

10. The method according to claim 9, which comprises:
    determining an operating state of the control circuit; and
    enabling the switching device in a manner dependent on the operating state that has been determined, the switching device only being able to be actuated if the switching device is enabled for actuation.

11. The method according to claim 10, which comprises monitoring an operating clock signal of the control circuit and enabling the switching device as long as the operating clock signal has no irregularity.

12. The method according to claim 10, which comprises interrupting the enabling of the switching device during the testing of the testable acceleration.

13. The method according to claim 9, which comprises generating a test signal for closing acceleration switch contacts of the testable accelerating switch and interrupting the enabling of the switching device at a beginning of the test signal.

14. The method according to claim 13, which comprises providing the switching signal of the testable acceleration switch with a defined time duration and the interruption of the enabling of the switching device is cancelled with an end of the switching signal.

* * * * *